UNITED STATES PATENT OFFICE.

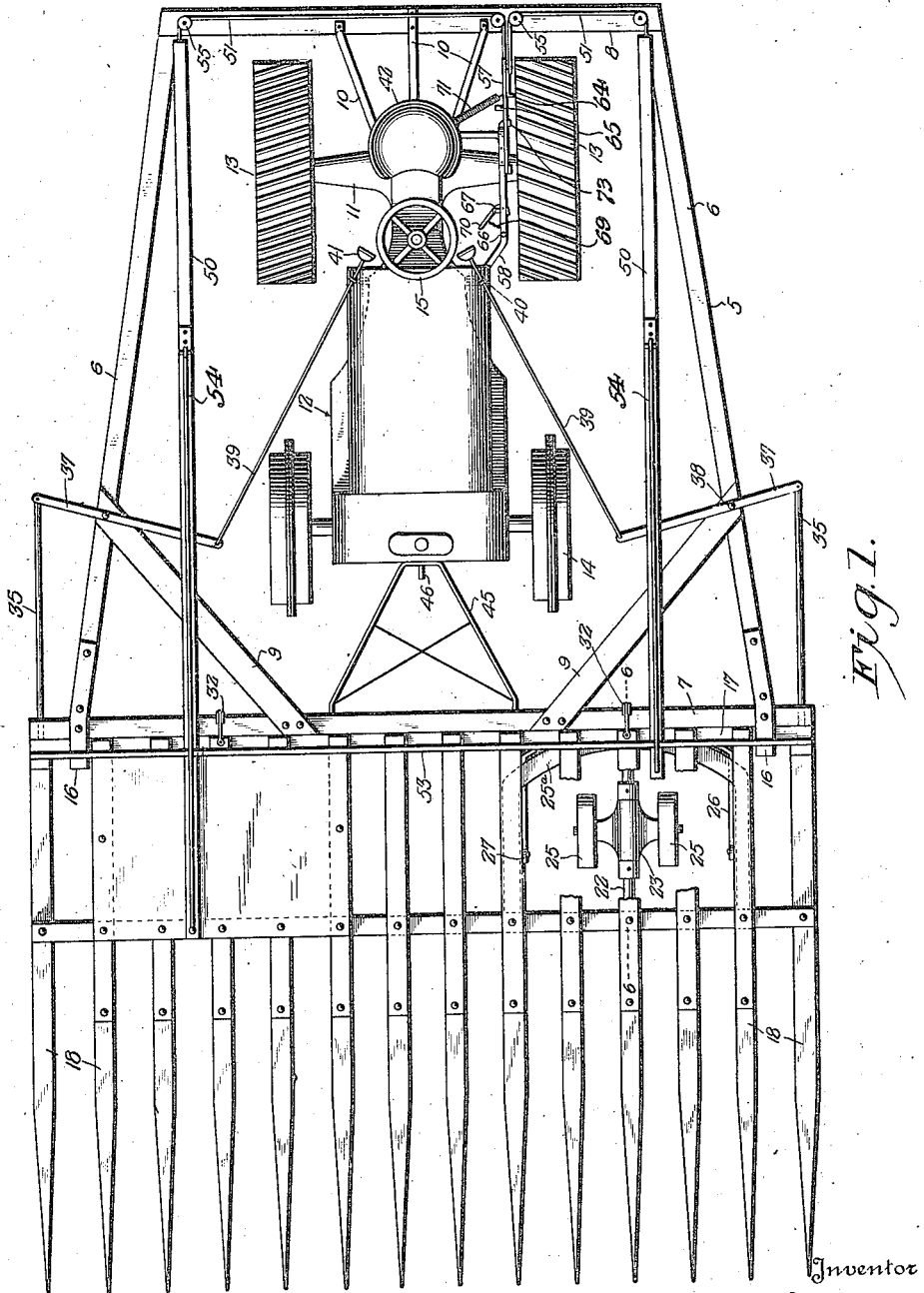

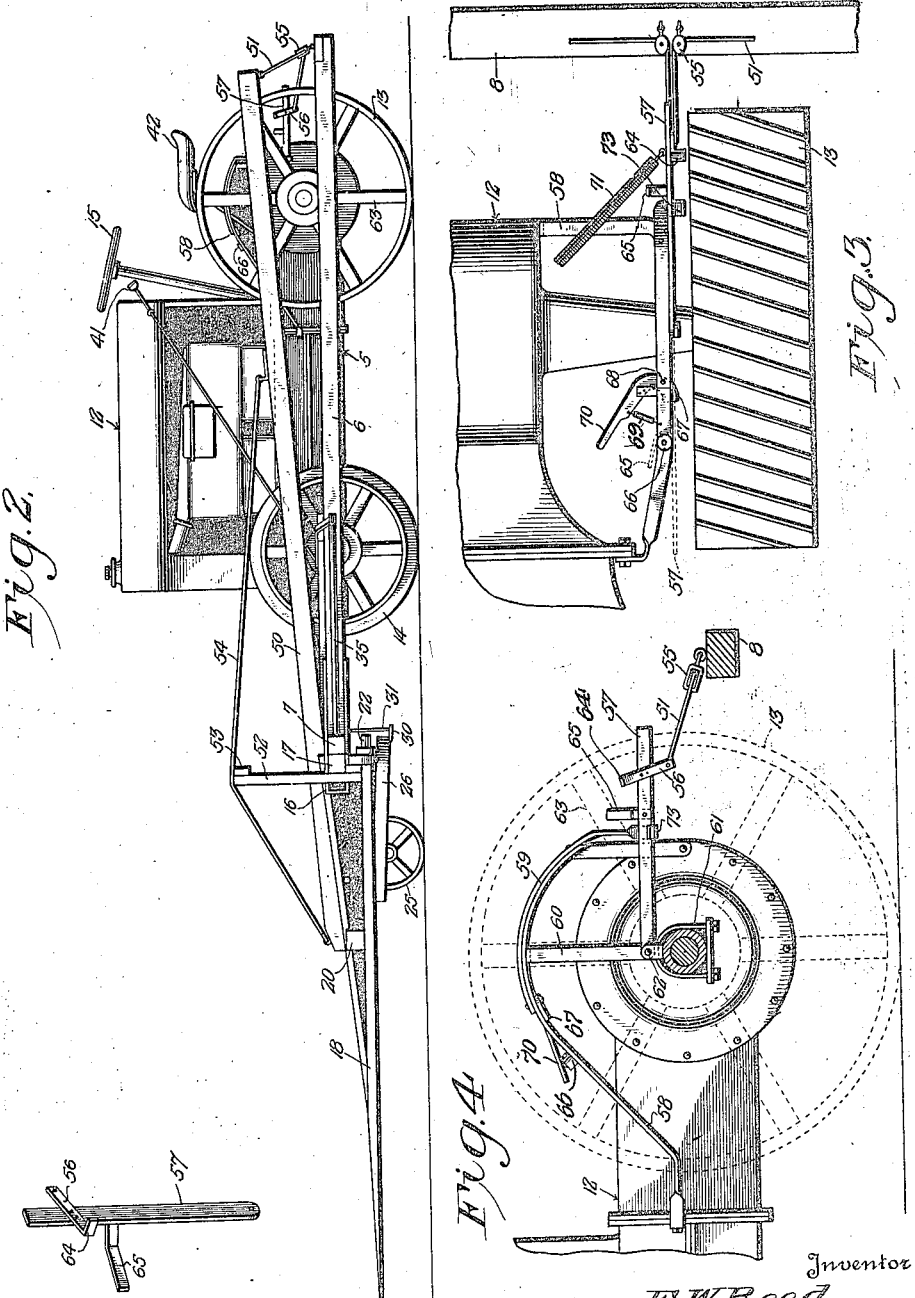

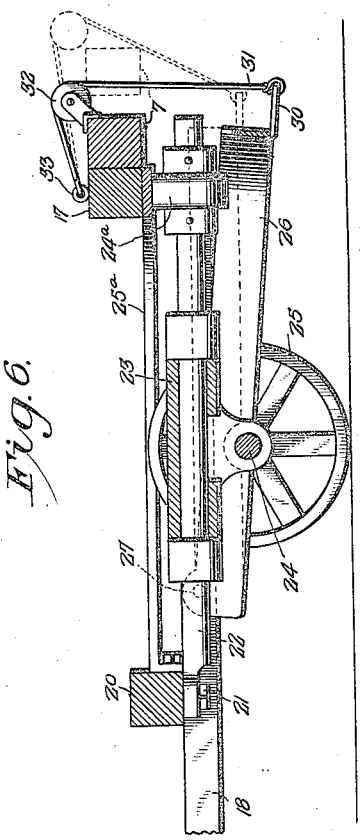
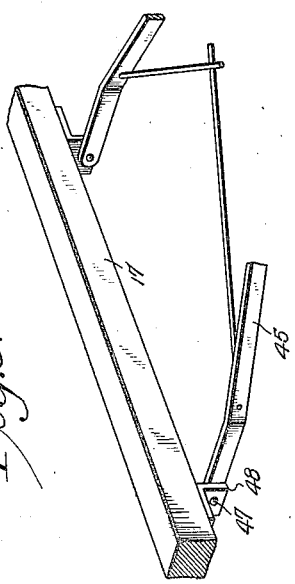
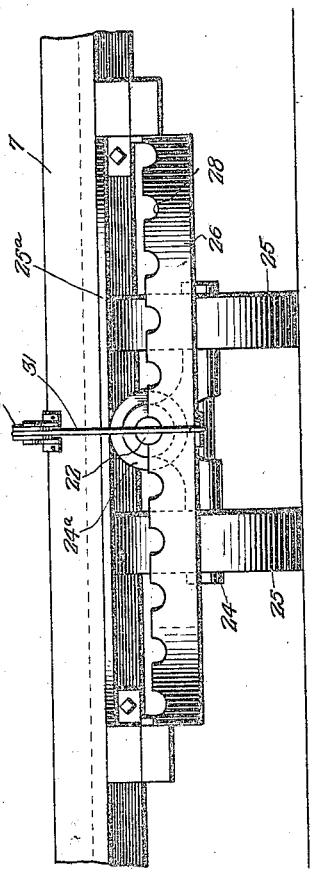

EARL W. REED, OF SUNNYSIDE, WASHINGTON.

MOTOR-DRIVEN BUCK RAKE.

1,424,943.   Specification of Letters Patent.   Patented Aug. 8, 1922.

Application filed January 5, 1921. Serial No. 435,130.

*To all whom it may concern:*

Be it known that I, EARL W. REED, a citizen of the United States, residing at Sunnyside, in the county of Yakima and State of Washington, have invented certain new and useful Improvements in a Motor-Driven Buck Rake, of which the following is a specification.

This invention relates to improvements in buck rakes of the type designed for operation by farm tractors and more particularly to the style of rake disclosed in my Patent #1,384,919, granted July 19, 1921.

The principal object of the present improvement resides in the loose mounting of the rake relative to the main supporting frame so as to accommodate the necessary upward tilting of the front extremities of the rake tines and also to provide for limited relative movement of the rake relative to the supporting frame structure, such as is effected when the direction of travel of the tractor is changed.

A further object is the provision of means responsive to the relative movement of the rake and supporting frame structure to effect the automatic locking of the hangers for the rake supporting wheels, whereby when the tractor is moving rearwardly the supporting wheel hangers are locked in adjusted position and prevented from swinging to either side.

A still further object is to provide means for effecting such relative adjustment of the main supporting frame and the rake as will change the position of the rake tines when lying on the ground and thus permit the tractor and rake to more readily change the direction of their travel.

A further object is the provision of a coupling member between the movable rake and the tractor constituting a moving or propelling means for the rake supplemental to the main frame structure and which is so constructed as to accommodate such relative movement of the rake and tractor as is necessary in traversing irregular ground.

A still further object resides in the provision of means adapted to coact with one of the tractor drive wheel spokes for utilizing the movement of the latter in effecting the automatic elevation of the points of the tines for maintaining the latter in such elevated position above the ground as to avoid the latter.

With these and other objects in view, the invention consists in certain novel features of construction as hereinafter shown and described, and specifically pointed out in the claims.

In the accompanying drawings:

Figure 1 represents a top plan view, partly broken away of the motor driven buck rake.

Fig. 2 is a side elevation thereof.

Fig. 3 represents a fragmentary top plan view of the invention, illustrating the means for coaction with the spokes of one of the tractor drive wheels for effecting the automatic elevation of the rake tines.

Fig. 4 is a side elevation of the mechanism illustrated in Fig. 3, the adjacent tractor drive wheel being removed and indicated by dotted lines.

Fig. 5 represents a perspective view of the spoke actuated lever removed from the tractor.

Fig. 6 is an enlarged fragmentary section on the line 6—6 of Fig. 1.

Fig. 7 is a fragmentary rear elevation of one set of supporting wheels for the rake, a fragment of the latter being illustrated.

Fig. 8 represents an enlarged fragmentary sectional view through the rear connecting bar of the rake and the adjacent extremity of one of the actuating rods therefor.

Fig. 9 represents a fragmentary perspective view of the supplemental coupling between the rake and tractor.

Referring to the drawings in detail, wherein similar reference numerals designate corresponding parts throughout the several views, the numeral 5 indicates generally the main supporting frame structure which includes rearwardly converging side members 6 and front and rear connecting members 7 and 8 which connect the front and rear extremities of the side members 6, respectively. The front frame member 7 is connected with the front portions of the side members 6 by diagonal brace rods 9. Whereas the rear frame member 8 is provided with brackets 10 for attachment to the differential gear case 11 or other part of the farm tractor designated generally by the numeral 12. The rear portion of the main frame structure 5 is supported in elevated position relative to the rear portion of the tractor 12 by the brackets 10 whereas the front portion of said frame structure is supported upon the ground engaging wheels carried by the rake, which latter will be hereinafter more fully described.

The tractor illustrated in the accompanying drawing is of the type wherein the drive wheels 13 are located at the rear, the direction of movement of the tractor being varied by proper adjustment of the front wheels 14 controlled by a steering wheel 15.

Forwardly extending yokes 16 are rigidly connected with the front terminals of the frame members 6 and receive the terminal portions of the front frame member 7, to which latter the yokes are rigidly connected. The yokes 16 are substantially U-shaped and are so arranged that the web portions thereof are disposed in spaced relation to the front frame member 7 thus providing a horizontal opening therethrough accommodating the rear connecting member 17 extending transversely across and connecting the rear extremities of the rake tines 18. The open portions of the yokes 16 are of such size as to accommodate oscillating movement of the rake bar 17 to permit the front extremities of the tines 18 to have a limited vertical movement from the ground upwardly to approximately the position shown in Fig. 2 and also to permit the rake bar 17 to move forwardly a limited distance from the frame member 7.

Forwardly of the rake bar 17, the tines 18 are connected by a front bar 20 provided with vertical pivot pins 21 on opposite sides of the longitudinal center thereof pivotally receiving the horizontally disposed hangers 22 on which the bearing member 23 is pivotally supported. Each bearing member 23 supports an axle 24 carrying ground engaging wheels 25 arranged intermediate the front and rear rake bars 20 and 17 and supporting the rear portion of the rake in a predetermined position above the ground. The pivotal mounting of the hangers 22 on the pivot pins 21 readily permit said hangers to turn according to the change of direction of travel of the tractor 12, resistance to the swinging movement of the rear extremities of the hangers being minimized by the utilization of rollers 24ª arranged to travel upon track rails 25ª curved concentrically with the pivotal pins 21 of the hangers 22.

A locking plate 26 is pivotally mounted at its opposite extremities 27 on opposite sides of each pivoted hanger 22 and is curved substantially concentric to the track rail 25ª, the top edge of the retaining plate 26 being provided with a series of notches 28 adapted to receive the extremity of the hanger 22 whereby the latter is locked in adjusted position relative to the rake under predetermined conditions. The medial portion of each retaining plate 26 is provided with a rearwardly directed arm 30 having connection with a flexible member 31 extending upwardly over a drive pulley 32 secured to the front frame member 7 and connected as at 33 with the rear rake bar 17. During forward movement of the tractor and rake, the rear rake bar 17 is maintained in engagement with the frame member 7 permitting the lower extremity of the flexible member 31 to descend to such position as to disengage the notches of the retaining plate 26 from the rear terminal of each hanger 22, thereby permitting free swinging movement of the hangers relative to the rake structure. It will be understood that when the frame member 7 and rake bar 17 are disposed in abutment with each other, the retaining plates 26 fall downwardly to inoperative position under their own weight, swinging upon the pivots 27. However when the direction of the tractor is reversed and the latter is travelling rearwardly, the rake lags behind the tractor causing the rake bar 17 to move longitudinally in the yokes 16 away from the frame member 7, thus exerting a longitudinal pull upon the flexible members 31 and elevating the curved plates 26 so as to engage the notches 28 of the latter with the rear terminals of the hangers 22. In this manner the hangers are automatically locked in adjusted position during rearward travel of the tractor and rake.

Rake actuating rods 35 are connected with the terminals of the rear rake bar 17, extend through apertures 36 formed in the adjacent portions of the front frame member 7 and are connected at their rear extremities with levers 37 pivotally mounted at 38 on the side members 6 of main frame structure. The inner extremities of the levers 37 are connected with operating elements 39 extending through suitable guides 40 provided upon the tractor 12 and the extreme rear terminals of the actuating elements are provided with handles 41 located conveniently near the driver of the tractor occupying the seat 42. By alternately exerting a longitudinal pull upon the actuating elements 39, the lever 37 associated therewith is actuated to produce a forward movement of the rod 35, the movement of the rod being transmitted to the rake bar 17 effecting a forward movement of that terminal of the latter with which the actuated rod 35 is connected. In this manner, either end of the rake may be advanced relative to the other thus effecting a corresponding movement of the tines when in ground engaging position and materially assisting in changing the direction of travel of the tractor and rake.

The medial portion of a supplemental coupling 45 is connected for pivotal movement on a pin 46 forming the usual equipment of a tractor 12 and the front divergent extremities of the supplemental coupling member 45 are pivotally connected at 47 to supporting brackets 48 rigidly secured beneath the rake bar 17. The pivotal mounting of the supplemental coupling member on the horizontal pin 46 readily permits the coupling member to change its position relative to the tractor during temporary elevation of either set of wheels 25 while the pivotal connections 47 between the rake bar 17 and the front extremities of the supplemental coupling member 45 accommodate the necessary relative movement of the rake supporting wheels 25 and the wheels of the tractor 12.

Arms 50 are secured to certain of the tines 18 of the rake, extend rearwardly and upwardly therefrom and are connected at their rear extremities with flexible actuating elements 51. Vertical posts 52 are mounted upon the rake structure and support a top bar 53 over which braces 54 for the arms 50 are arranged.

The arms 50 are arranged on opposite sides of the drive wheels 13 of the tractor and the actuating cables 51 therefor are extended over suitably arranged groups of guide pulleys 55 disposing the terminals of the cables or flexible elements in position for connection with an arm 56 carried by the spoke actuated lever 57. A bracket 58 is adequately supported upon the body of the tractor 12 and the medial portion thereof is curved, as indicated at 59, substantially concentric with the axis of the adjacent drive wheel 13. An intermediate brace 60 for the bracket 58 is connected with the curved portion 59 of the latter and is attached by a clip 61 to a portion of the drive axle housing of the tractor, as clearly shown in Fig. 4. The lever 57 is pivotally secured at 62 to the brace 60. The lever 57 is constructed of such flexible material as will permit it to be flexed laterally toward the spokes 63 of the adjacent drive wheel 13 whereby the hooked extremity 64 of the arm 56 embraces a spoke and causes the lever 57 to be swung forwardly in synchronism with the rotation of the drive wheel. The lever 57 is pivoted inwardly of the arm 56 to a second arm 65, the extremity of which is so inclined as to engage behind a roller 66 secured to the bracket 58 and effect the automatic withdrawal of the hooked extremity 64 of the arm 56 from the spoke of the drive wheel 13. Coincident with the release of the arm 56 from the spoke of the wheel, the lever is locked in forwardly projected position by a latch member 67 pivotally secured at 68 to the bracket 58 and normally maintained in operative position by a spring 69. The spring connected terminal of the latch is preferably provided with a handle 70 for convenience in manipulating the latch to release the lever 57 and permit the latter to return to initial position. During such return movement of the lever, the latter is maintained in contact with the edge of the curved portion of the bracket 58 by a contractile spring 71, thus preventing the accidental engagement of the angular extremity 64 of the arm 56 with the spoke of the wheel. As will be understood, the lever is automatically returned to its initial position by the weight of the rake which obviously exerts a longitudinal pull on the flexible members 51. The return movement of the lever is limited by the hooked extremity 73 of the bracket 58 and the free end of the lever is so disposed as to be conveniently grasped by the driver of the tractor occupying the seat 42 and swung laterally into engagement with the spokes 63 of the drive wheel.

In use, the buck rake is propelled as a unit with the tractor 12, the pointed extremities of the tines 18 moving over the ground and gathering such material as is disposed in the path thereof. As the tractor travels forwardly, the rear rake bar 17 is maintained in abutment with the front frame member 7 and, producing the necessary slack in the flexible members 31, the retaining plates 26 descend to inoperative position permitting the ground engaging wheels 25 to swing with the pivoted hangers 22, according to the direction of travel of the tractor. However, when the tractor is driven rearwardly, the supporting wheels 25 for the rake lag behind causing the rear rake bar 17 to be withdrawn from engagement with the front frame member 7, as suggested in dotted lines in Fig. 6, thereby exerting a longitudinal pull on the flexible members 31 and moving the curved retaining plates 26 to such position as to engage the notches 28 thereof with the extremities of the hangers 22 and lock the latter in adjusted position. As the direction of movement of the tractor is changed and the latter again travels forwardly, the rake bar 17 is returned to facial abutment with the frame member 7 and the curved retaining plates 26 descend to inoperative position. When the rake tines are in ground engaging position adjustment of the steering wheel 15 is made to cause the tractor to take a curve, and it is preferable to simultaneously adjust the actuating elements 39 to cause advancement of the tines at one terminal of the rake relative to those at the other end so that the steering effect of the wheels 14 is materially assisted when the rake is heavily loaded. In elevating the rake tines to inoperative position, the operator of the tractor manually disengages the flexible lever 57 from the hooked extremity 73 of the bracket and, moving the lever laterally toward the spokes of the wheel engages the catch 64 of the arm 56 with the wheel spoke causing the lever 57 to be swung forwardly, the movement of the lever being transmitted to the vertically movable rake tines through the cables, chains or other flexible devices 56. As the lever 57 approaches the limit of its angular forward movement its finger 65 is engaged by the roller 66 thereby withdrawing the angular catch 64 of the arm 56 of the lever from the wheel spoke and simultaneously locking the lever in forwardly projected position by the latch 67. It is evident that the tines of the rake may be maintained in elevated or inoperative position for any desired period and in order to permit the tines to return to operative position it is simply necessary to actuate the handle 70 of the latch causing the lever engaging terminal 67 thereof to move out of the path of the lever thereby permitting the latter to return to initial position.

What is claimed is:

1. In combination, a supporting frame attachable to and transportable by a tractor, a tiltable rake structure carried by the frame, and means engageable with a spoke of one of the drive wheels of the tractor for effecting automatic adjustment of the rake structure.

2. In combination, a supporting frame attachable to and transportable by a tractor, a rake structure, and means engageable with a moving part of the tractor for effecting automatic adjustment of the rake structure relative to the frame, said means including a flexible lever movable into engagement with the moving part of the tractor.

3. In combination, a supporting frame attachable to and transportable by a tractor, a rake structure movably connected with the frame and adjustable relative thereto, and means for adjusting the rake structure, said adjusting means including a flexible lever movable into engagement with a moving part of the tractor, means for effecting the automatic disengagement of the lever from the tractor, and means for locking the lever in adjusted position.

4. In combination, a supporting frame attachable to and transportable by a tractor, a tiltable rake structure carried by the frame, pivoted hangers carried by the rake structure, supporting wheels for the rake structure mounted for movement with the pivoted hangers for changing the direction of travel of the rake structure, means for retaining the hanger in adjusted position, and means responsive to independent movement of the rake structure and frame incident to rearward movement of the tractor for shifting the retaining means to operative position and maintaining the hangers in adjusted position.

5. In combination, a supporting frame attachable to and transportable by a tractor, a rake structure, means loosely connecting the rake structure and the supporting frame and permitting limited relative movement thereof, supporting wheels for the rake structure, hangers connected with the supporting wheels and pivotally attached to the rake structure for accommodating changes in the direction of travel of the latter, said rake structure being normally maintained in engagement with the supporting frame during forward travel of the tractor, and means responsive to relative movement of the frame and rake structure incident to rearward movement of the tractor for automatically maintaining the hangers in adjusted position.

6. In combination, a supporting frame attachable to and transportable by a tractor, a rake structure mounted for relative movement on the frame, ground engaging supporting wheels for the rake structure, and means for adjusting the rake structure relative to the frame.

7. In combination, a supporting frame attachable to and transportable by a tractor, a rake structure partially supported by the supporting frame and capable of limited relative movement with respect to the frame, ground engaging supporting wheels carried by the rake structure, and means for advancing either extremity of the rake structure to cause corresponding advancement of the adjacent ground engaging wheel and thereby change the direction of travel of the rake structure.

8. In combination, a supporting frame attachable to and transportable by a tractor, a rake structure partially carried by the supporting frame and having movement relative thereto, supporting wheels carried by the rake structure, and manually operable means for alternately advancing the opposite extremities of the rake structure.

9. In combination, a supporting frame attachable to and transportable by a tractor, a rake structure mounted for limited movement relative to the supporting frame and partially supported thereby, hangers pivotally connected with the rake structure, ground engaging supporting wheels mounted on the hangers and arranged beneath the rake structure, said hangers being adapted to swing upon their axes during forward movement of the frame and rake structure, means responsive to relative movement of the rake structure and supporting frame incident to rearward movement of the propelling tractor to automatically lock the hangers in adjusted position, and independently operable means for alternately advancing the opposite sides of the rake structure relative to the supporting frame.

10. In combination, a supporting frame, means for attaching the rear portion of the latter to a tractor, a tiltable rake structure movably connected with the supporting frame, ground engaging wheels carried by the frame structure supporting the latter and the front extremity of the supporting frame, and a supplemental tractor coupling pivotally connected with the rake structure and engageable with the front portion of a tractor.

11. In combination, a supporting frame, means for attaching the rear portion of the frame to the rear portion of a tractor, a tiltable rake structure movably connected with the front extremity of the supporting frame, ground engaging wheels carried by the rake structure supporting the latter together with the front portion of the supporting frame, and a supplemental coupling member pivotally connected with the rear portion of the tiltable rake structure and engageable with the front portion of a tractor for assisting the transportation of the frame and rake structure.

In testimony whereof, I affix my signature hereto.

EARL W. REED.